(12) United States Patent
Xiong et al.

(10) Patent No.: US 10,691,969 B2
(45) Date of Patent: Jun. 23, 2020

(54) ASYNCHRONOUS OBJECT ROI DETECTION IN VIDEO MODE

(71) Applicant: EagleSens Systems Corporation, George Town, Grand Cayman (KY)

(72) Inventors: Weihua Xiong, Cupertino, CA (US); Guangbin Zhang, Cupertino, CA (US)

(73) Assignee: EAGLESENS SYSTEMS CORPORATION, George Town (KY)

( * ) Notice: Subject to any disclaimer, the term of this patent is extended or adjusted under 35 U.S.C. 154(b) by 107 days.

(21) Appl. No.: 16/161,448

(22) Filed: Oct. 16, 2018

(65) Prior Publication Data

US 2019/0138835 A1  May 9, 2019

Related U.S. Application Data

(60) Provisional application No. 62/582,310, filed on Nov. 6, 2017.

(51) Int. Cl.
*G06K 9/00* (2006.01)
*G06K 9/32* (2006.01)
*G06N 5/04* (2006.01)
*G06N 20/00* (2019.01)
*G06K 9/62* (2006.01)

(52) U.S. Cl.
CPC ....... *G06K 9/3241* (2013.01); *G06K 9/00805* (2013.01); *G06K 9/6292* (2013.01); *G06N 5/04* (2013.01); *G06N 20/00* (2019.01)

(58) Field of Classification Search
CPC ... G06K 9/3233–3266; G06K 9/00805; G06K 9/6292; G06N 20/00; G06N 5/04; G06T 7/11; G06T 7/194
See application file for complete search history.

(56) References Cited

U.S. PATENT DOCUMENTS

| | | | |
|---|---|---|---|
| 8,965,115 B1* | 2/2015 | Khosla | G06K 9/00664 382/103 |
| 2010/0278425 A1* | 11/2010 | Takemoto | G06T 7/10 382/173 |
| 2014/0003708 A1* | 1/2014 | Datta | G06K 9/6256 382/159 |
| 2015/0025372 A1* | 1/2015 | Ghosh | A61B 6/481 600/431 |
| 2015/0030202 A1* | 1/2015 | Fleites | G06K 9/00711 382/103 |
| 2016/0323627 A1* | 11/2016 | Lievens | G06K 9/6227 |
| 2017/0286792 A1* | 10/2017 | Ackerman | H04N 5/2329 |
| 2017/0358102 A1* | 12/2017 | Akiyama | G06K 9/6288 |

(Continued)

*Primary Examiner* — Sean T Motsinger
(74) *Attorney, Agent, or Firm* — Sheppard Mullin Richter & Hampton LLP

(57) ABSTRACT

An image data processing method includes receiving, from an image sensor, frame image data of a plurality of frames; receiving a plurality of control rules comprising a respective control rule for each of the frames, wherein each of the control rules identifies one of a plurality of process regions and one of a plurality of object detectors; identifying a region of interest in each frame by a location and a category, comprising applying the object detector identified by the respective control rule to the respective frame image data in the process region identified by the respective control rule; identifying a final region of interest based on the identified regions of interest; and reporting the final region of interest.

18 Claims, 8 Drawing Sheets

(56) References Cited

U.S. PATENT DOCUMENTS

| | | | |
|---|---|---|---|
| 2019/0026567 A1* | 1/2019 | Choudhary | G08G 1/065 |
| 2019/0034814 A1* | 1/2019 | Amer | G06K 9/6234 |
| 2019/0130580 A1* | 5/2019 | Chen | G06K 9/2054 |
| 2019/0138833 A1* | 5/2019 | Xiong | G06K 9/3233 |
| 2019/0138835 A1* | 5/2019 | Xiong | G06K 9/3241 |
| 2019/0164313 A1* | 5/2019 | Ma | G06K 9/6267 |
| 2019/0220668 A1* | 7/2019 | Siskind | G06T 7/70 |
| 2019/0251340 A1* | 8/2019 | Brown | G06N 3/08 |
| 2019/0355113 A1* | 11/2019 | Wirch | G06T 7/33 |
| 2019/0392212 A1* | 12/2019 | Sawhney | G06K 9/00201 |

* cited by examiner

ASYNCHRONOUS OBJECT ROI DETECTION IN VIDEO MODE

CROSS REFERENCE TO RELATED APPLICATION

The present application claims priority to U.S. Provisional Patent Application No. 62/582,310, filed Nov. 6, 2017, entitled "Asynchronous Object ROI Detection in Video Mode," the entire content of which is incorporated by reference herein.

FIELD OF THE INVENTION

This disclosure generally relates to image data processing methods based on artificial intelligence and image sensors configured to perform the same.

BACKGROUND

A region of interest (ROI) is subset of image pixels that are identified for a particular purpose. This concept is commonly used in image and vision related applications. Normally, several objects, and their locations in the image, are needed from a single scene. For example, in surveillance systems, the system typically concentrates on several specific subjects, such as vehicle license plates, faces, etc., at the same time.

Many ROI extraction methods have been proposed. Recently, many machine learning approaches have been proposed, including Support Vector Machine (SVM), Adaboost, and Convolutional Neural Network (CNN). However, there is no general method that can detect all types of objects with the same parameters. A common and direct method, called 'Simultaneous Inference,' applies different object detectors (using either different methods or the same method with different parameters) on the same frame to find all required ROIs from one frame at a time, which requires long processing times, large power consumption, and high output transfer bandwidth.

SUMMARY

In general, one aspect disclosed features an image data processing method comprising: receiving frame image data of a plurality of frames; receiving a plurality of control rules comprising a respective control rule for each of the frames, wherein each of the control rules identifies one of a plurality of process regions and one of a plurality of object detectors; identifying a region of interest in each frame by a location and a category, comprising applying the object detector identified by the respective control rule to the respective frame image data in the process region identified by the respective control rule; identifying a final region of interest based on the identified regions of interest; and reporting the final region of interest.

Embodiments of the method may include one or more of the following features. In some embodiments, identifying a final region of interest comprises: identifying a final location of the final region of interest based on the locations of the regions of interest. In some embodiments, identifying a region of interest in each frame comprises: identifying a category confidence value, wherein the category confidence value represents a confidence in the identified category. In some embodiments, identifying a final region of interest comprises: identifying a category of the final region of interest based on the categories of the regions of interest. In some embodiments, identifying a category of the final region of interest comprises: selecting one of the categories according to the category confidence values. In some embodiments, selecting one of the categories comprises: selecting the one of the categories having the highest category confidence value.

In general, one aspect disclosed features an image sensor comprising: an image sensor; a frame input unit configured to receive, from the image sensor, frame image data of a plurality of frames; a rule input unit configured to receive a plurality of control rules comprising a respective control rule for each of the frames, wherein each of the control rules identifies one of a plurality of process regions and one of a plurality of object detectors; a process unit configured to identify a region of interest in each frame by a location and a category, the process unit further configured to comprising applying the object detector identified by the respective control rule to the respective frame image data in the process region identified by the respective control rule; a vote unit configured to identify a final region of interest based on the identified regions of interest; and a report unit configured to report the final region of interest.

Embodiments of the image sensor may include one or more of the following features. In some embodiments, the vote unit is further configured to: identify a final location of the final region of interest based on the locations of the regions of interest. In some embodiments, the process unit is further configured to: identify a category confidence value, wherein the category confidence value represents a confidence in the identified category. In some embodiments, the vote unit is further configured to: identify a category of the final region of interest based on the categories of the regions of interest. In some embodiments, to identify the category of the final region of interest, the vote unit is further configured to: select one of the categories according to the category confidence values. In some embodiments, to select one of the categories, the vote unit is further configured to: select the one of the categories having the highest category confidence value.

In general, one aspect disclosed features non-transitory machine-readable storage medium encoded with instructions executable by a hardware processor, the machine-readable storage medium comprising instructions to cause the hardware processor to perform an image data processing method, the method comprising: receiving, from an image sensor, frame image data of a plurality of frames; receiving a plurality of control rules comprising a respective control rule for each of the frames, wherein each of the control rules identifies one of a plurality of process regions and one of a plurality of object detectors; identifying a region of interest in each frame by a location and a category, comprising applying the object detector identified by the respective control rule to the respective frame image data in the process region identified by the respective control rule; identifying a final region of interest based on the identified regions of interest; and reporting the final region of interest.

Embodiments of the medium may include one or more of the following features. In some embodiments, identifying a final region of interest comprises: identifying a final location of the final region of interest based on the locations of the regions of interest. In some embodiments, identifying a region of interest in each frame comprises: identifying a category confidence value, wherein the category confidence value represents a confidence in the identified category. In some embodiments, identifying a final region of interest comprises: identifying a category of the final region of interest based on the categories of the regions of interest. In some embodiments, identifying a category of the final region of interest comprises: selecting one of the categories according to the category confidence values. In some embodiments, selecting one of the categories comprises: selecting the one of the categories having the highest category confidence value.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

One or more of the various embodiment of the present disclosure is directed to detecting regions of interest (ROIs) for objects in frames of video. In particular, when several objects' ROIs are to be determined in a video, rather than provide all of the results from a single frame simultaneously, the invention provides partial ROIs from multiple frames. Advantages of this approach include reducing process time, power consumption and transfer bandwidths.

This invention presents an 'Asynchronous Inference' method that determines partial ROIs from each frame in a video, and switches control over different object detectors. Each partial ROI may be from one predefined type of object category, one predefined processing region, or a combination thereof. This approach takes advantage of the fact that the required objects do not change a lot among consecutive frames in a video. Assuming there are N different categories and the image is divided into M Processing Regions, the overall cost of this invention, including computation time, power consumption or ROI transfer bandwidths, is approximately 1/(N*M) of the cost of Simultaneous Inference.

According to some embodiments, one or more ROIs are determined by employing an artificial intelligence (AI) based image recognition technique referred to herein as 'asynchronous object ROI detection in video mode.' According to this technique, it is possible to obtain frame image data that can be transmitted through a data communication link of a narrow bandwidth, while maintaining specificity of key contents of the image data. In some embodiments, an image sensor configured to carry out an AI-based image recognition may be mounted on a post near a traffic signal, a pedestrian crossing for a roadway, or the like. Image data obtained from the image sensor may be transmitted to a local system and further a cloud system for further image processing. When the image sensor is mounted as described, the key contents of the image data may include valuable information, such as the identities of people, vehicles, and the like.

Figure 1:
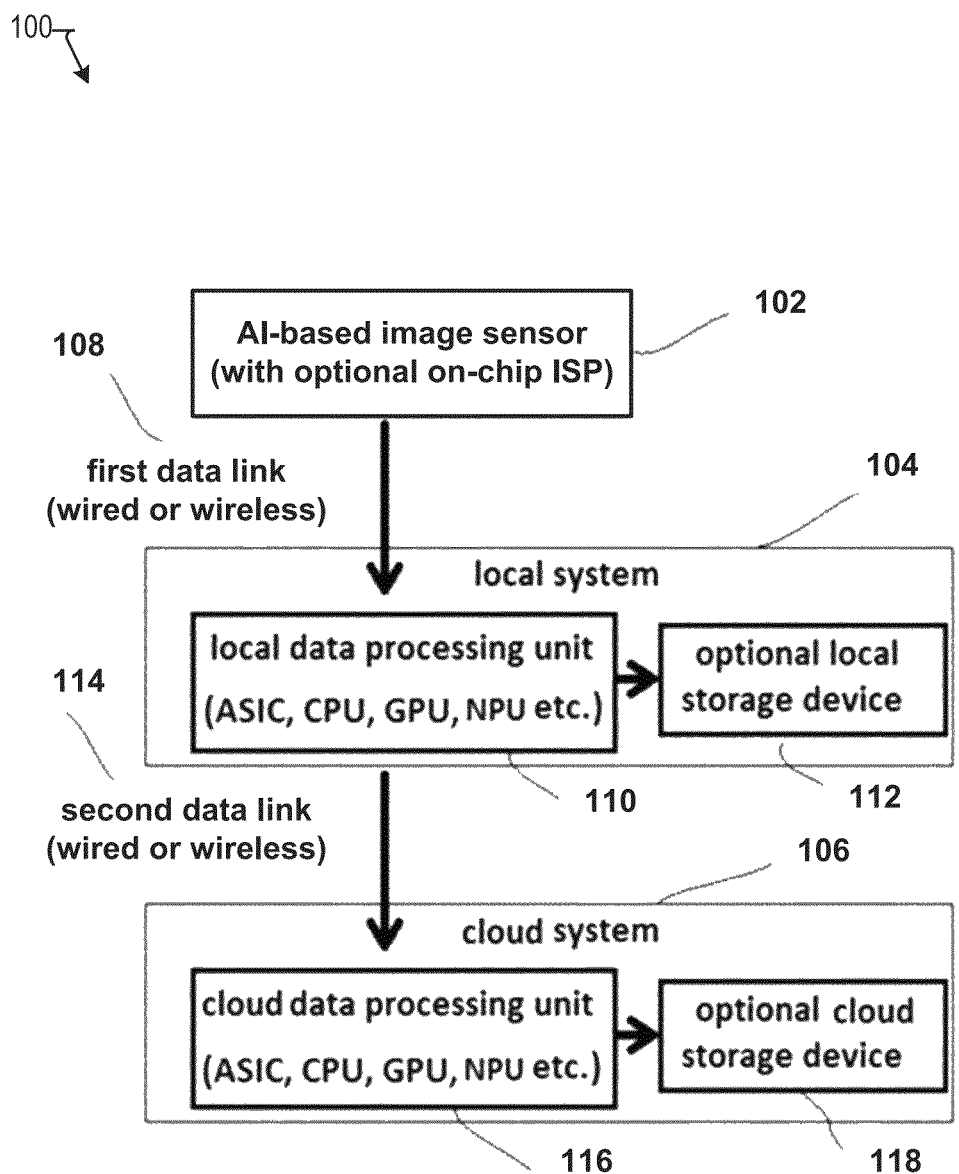
FIG. 1 illustrates an exemplary system for communicating video frame image data captured by an artificial intelligence (AI) based image sensor according to various embodiments.

FIG. 1 illustrates an exemplary system 100 for communicating video frame image data captured by an artificial intelligence (AI) based image sensor according to various embodiments. In FIG. 1, the system 100 includes an artificial intelligence (AI) based image sensor 102, a local system 104, and a cloud system 106.

The AI-based image sensor 102 is configured to obtain original video frame image data from the real world and carry out AI-based image data processing. In some embodiments, the AI-based image sensor 102 is configured to obtain original video frame image data from the image sensor array, and pre-process the obtained original video frame image data to extract key information. Through the pre-processing, the AI sensor chip 102 may reduce the bandwidth from the original video frame data rate to a lower bandwidth data stream which can be transferred through the first data link 108. In some embodiments, in extracting key information, the AI-based image sensor 102 is configured to determine which part of the original video frame data may contain key image data and needs to be kept, and non-key image data that may be compressed to reduce the overall data bandwidth. More detail of the AI-based image data processing will be described below.

In some embodiments, the AI-based image sensor 102 is formed as a chip on which an image sensor array is disposed. In a specific implementation, the AI-based image sensor 102 also includes an image signal processor (ISP) on the chip to carry out the AI-based image data processing. In a specific implementation, the AI-based image sensor 102 may be mounted on a post to capture surrounding images thereof. The output image data from the AI-based image sensor 102 may be either raw or ISP processed format, such as YUV, or Motion-JPEG. The output image data from the AI-based image sensor 102 is transmitted through the first data link 108 to a local data processing unit 110 in the local system 104. The first data link 108 may be a wired link or a wireless link, and the wireless link may be any applicable wireless data communication link such as a WiFi, Bluetooth, ZigBee, etc.

The local system 104 represents a computing system disposed proximate to the AI-based image sensor 102 and configured to perform additional image data processing for various applicable purposes. For example, when the AI-based image sensor 102 is mounted on a post to capture images of surrounding environments, the local system 104 may be a computing system configured to perform an autonomous operation of operating roadway signals for pedestrians and vehicles based on output image data from the AI-based image sensor 102. In some embodiments, the local data processing unit 110 is implemented as a field-programmable gate array (FPGA), a graphics processing unit (GPU), a tensor processing unit (TPU), a network processing unit (NPU), and/or a central processing unit (CPU).

In some embodiments, the AI-based image sensor 102 may be manufactured using a mixed-signal silicon process, e.g., 90 nm mixed-signal process, which supports both digital MOSFET and analog MOSFET as sensor elements of the AI-based image sensor 102. To the contrary, the local data processing unit 110 may be manufactured using digital MOSFET. For that reason, a highly advanced silicon process, e.g., 14 nm process, may be employed to achieve high performance. Therefore, in some embodiments, it may be preferable to dispose the ISP in the local system 104 rather than to use an on-chip ISP within the AI-based image sensor 102.

The local system 104 may also include an optional local storage device 112 for storing image data processed by the local data processing unit 110. The bandwidth of the first data link 108 and/or the processing power of the local data processing unit 110 is typically limited. As a result, the resolution and frame rate of the AI-based image sensor 102 that can be effectively utilized may be largely limited in many applications. Output image data of the local system 104 is transmitted through a second data link 114 to the cloud system 106.

The cloud system 106 represents a computing system disposed separately from the local system 104 and the AI-based image sensor 102 and configured to perform additional image data processing for various applicable purposes. For example, when the local system 104 is mounted on a post to capture images of surrounding environments, the cloud system 106 may be a server computing system configured to perform data analysis of operations by the local system 104 and/or image data obtained from the local system 104. The data analysis may include traffic analysis, monitoring of vehicles, humans, animals, etc. The cloud system 106 includes a cloud data processing unit 116 and an optional cloud storage device 118. In some embodiments, the cloud data processing unit 116 has a more powerful processing power than the local data processing unit 110 and the optional cloud storage device 118 has a larger storage capacity than the optional local storage device 112. In a specific implementation, the bandwidth of the second data link 114 may be significantly limited in comparison to the processing power of the local data processing unit 110.

Figure 2:
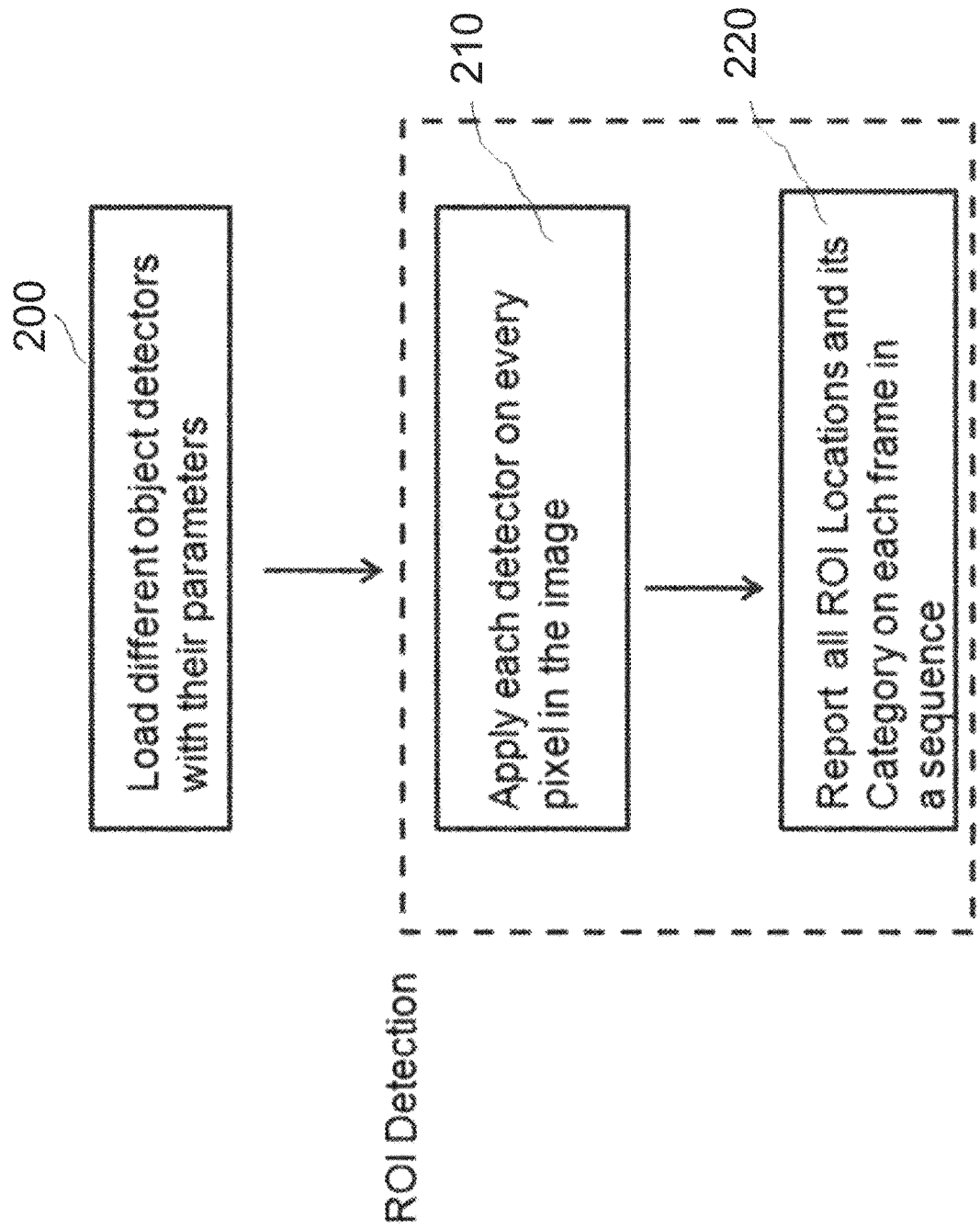
FIG. 2 shows a conventional process for ROI detection from a single image.

FIG. 2 shows a conventional process for ROI detection from a single image. An input unit 200 loads a plurality of different object detectors, and their respective trained parameters, that can determine ROIs. The trained parameters represent fundamental features of interesting objects. Each object detector can implement any machine learning strategy, including Support Vector Machine (SVM), Adaboost, Convolutional Neural Network (CNN) or others.

A simultaneous inference unit 210 identifies ROIs and provides corresponding confidence values by accepting a single image, and applying each object detector and its parameters on every block centered at each pixel. A vote unit 220 labels each ROI and its category based on a maximal confidence value from the different detectors, and reports that information.

Figure 3:
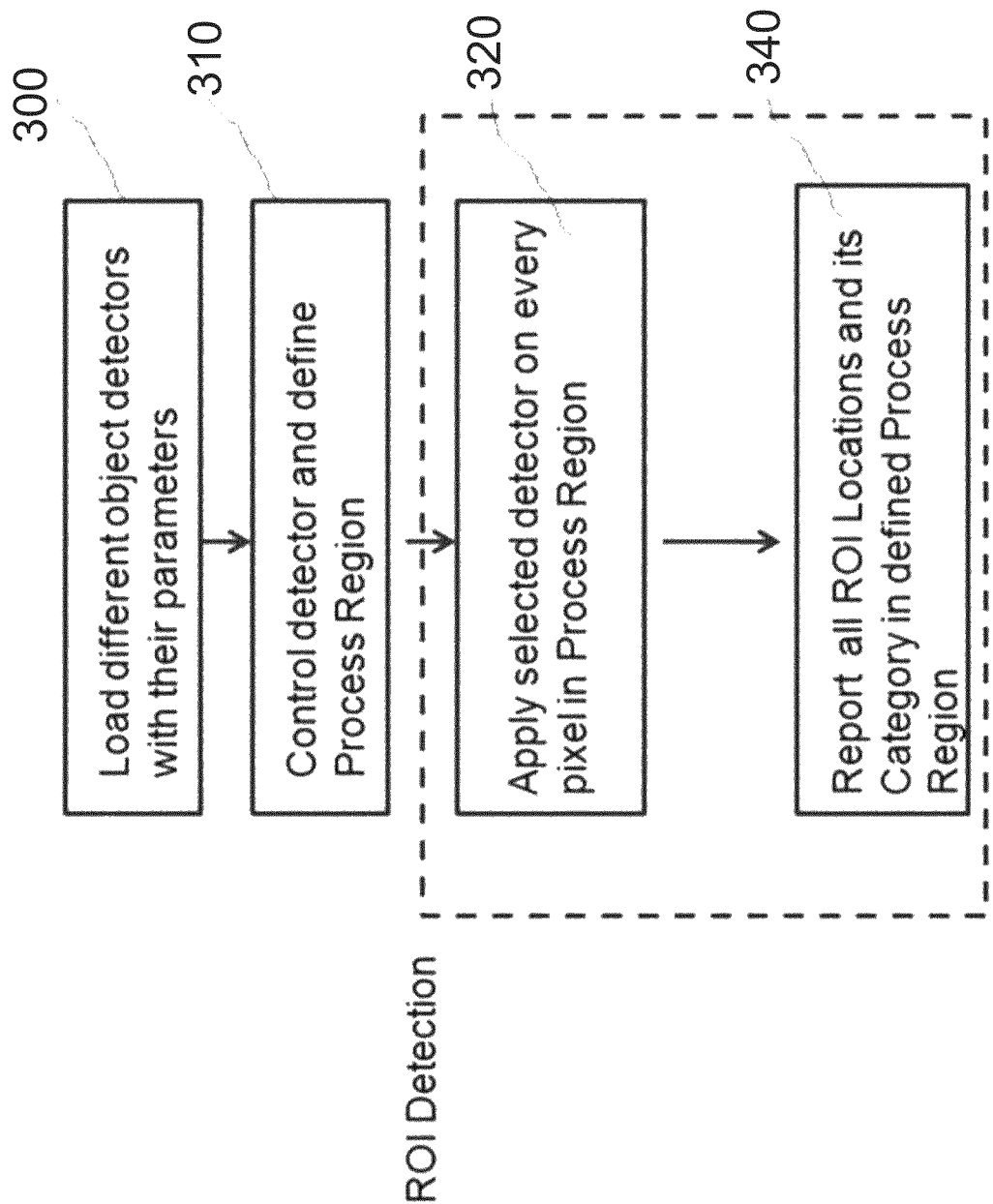
FIG. 3 illustrates an exemplary data flow in an AI-based image data processing device for asynchronous object ROI detection from a sequence of frames according to various embodiments.

FIG. 3 illustrates an exemplary data flow in an AI-based image data processing device for asynchronous object ROI detection from a sequence of frames according to various embodiments. The AI-based image data processing device includes an input unit 310, a process unit 320, and a vote unit 340. Different from traditional simultaneous inference, a new control unit 310 is added. Each of the input unit 300, process unit 320, vote unit 340, and new control unit 310 may be configured by a specifically configured circuitry and/or a software-based computer system described below with reference to FIG. 8.

Input unit 300 loads a plurality of different object detectors, and their respective trained parameters, that can determine object ROIs. The trained parameters represent fundamental features of interesting objects. Each object detector can implement any machine learning strategy, including Support Vector Machine (SVM), Adaboost, Convolutional Neural Network (CNN) or others.

Control unit 310 selects an object detector and a predefined process region to be used on the current frame. The object detector and predefined process region to be used on the current frame can be extracted from a pre-configured lookup table based on the intended application. A block size is defined. The object detectors and process regions may be defined by a customer using a menu or the like. If the camera position changes, the customer may redefine the process regions. The customer may also redefine the object detectors, for example from detecting people to detecting vehicles.

Process unit 320 accepts the image data inside the predefined processing region, applies the selected object detector and its parameters on every block centered at each pixel to identify ROIs and categories, and provides confidence values for the categories. Vote unit 340 labels the ROIs and their categories based on the confidence values from the different detectors, and reports that information.

Figure 4:
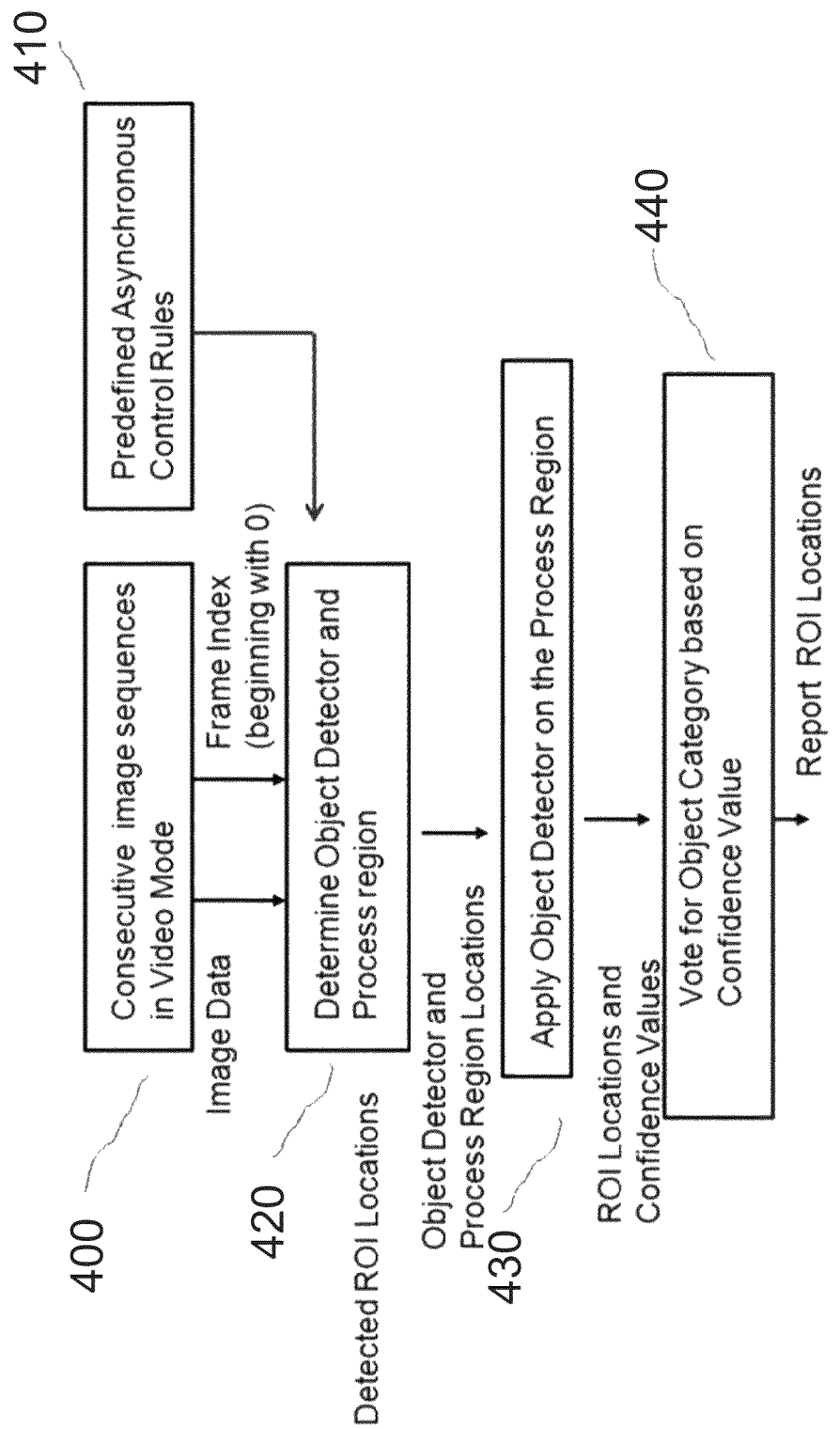
FIG. 4 presents a data processing flow for asynchronous ROI detection from a sequence of frames according to various embodiments.

FIG. 4 presents a data processing flow in an AI-based image data processing device for asynchronous ROI detection from a sequence of frames according to various embodiments. The AI-based image data processing device includes a frame input unit 400, a rule input unit 410, a select unit 420, a detect unit 430, and a vote unit 440. Each of frame input unit 400, rule input unit 410, select unit 420, detect unit 430, and vote unit 440 may be configured by a specifically configured circuitry and/or a software-based computer system such as described below with reference to FIG. 8.

The main input data are consecutive image frames in video mode, received by frame input unit 400. Each frame is assigned a frame index, beginning with frame index 0. Rule input unit 410 receives predefined asynchronous control rules. The function in select unit 420 selects the object detector and process region locations to be applied to the current frame. Detect unit 430 applies the selected object detector to the selected process region and provides a location, category, and confidence value for each of the detected object ROIs. Vote unit 440 labels the ROIs and their categories based on the confidence values from the different detectors, and reports that information. If multiple categories are assigned to the same object, the final category is selected based on the category confidence values.

Table 1 presents a format of the control rules used in asynchronous ROI detection for a sequence of frames according to various embodiments. The format includes a Loop Number and a Rule Table. The Loop Number defines the frame interval where the same rule will be applied. Thus the Loop Number identifies how many frames are processed together.

TABLE 1

| | Loop Number 4 | |
|---|---|---|
| Index Number | Object Detector Index | Process Region |
| 0 | 1 (People Detector) | [0 0 1079 799] |
| 1 | 2 (Vehicle Detector) | [0 800 1079 1970] |
| 2 | 1 | [0 0 1079 989] |
| 3 | 1 | [0 800 1079 1970] |

The Loop Table has a size of Loop Number. Each row of the Loop Table corresponds to a control rule, including three items: Index Number, Object Detector Index, and Process Region. The Index Number corresponds to the remainder of the current frame index divided by the Loop Number. The Object Detector Index defines the object detector corresponding to the loop index number. The Process Region defines the process region, for example by the left-top and right-bottom x/y coordinates of the process region corresponding to the loop index number.

Figure 5:
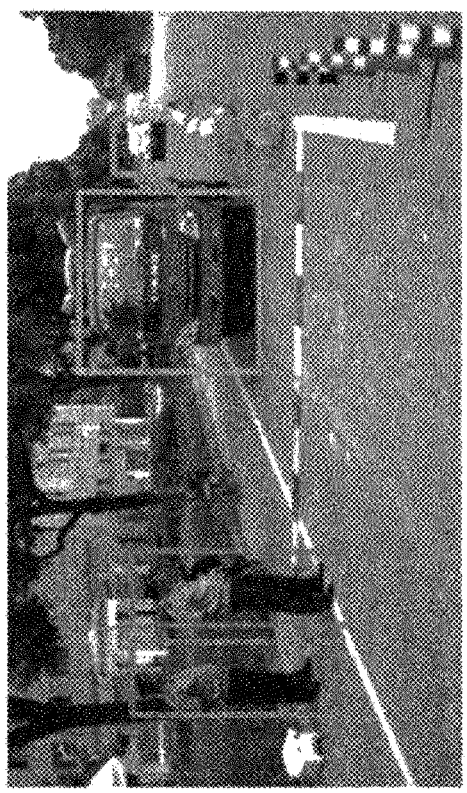
FIG. 5 presents an example output of simultaneous inference in ROI detection.
Figure 5:
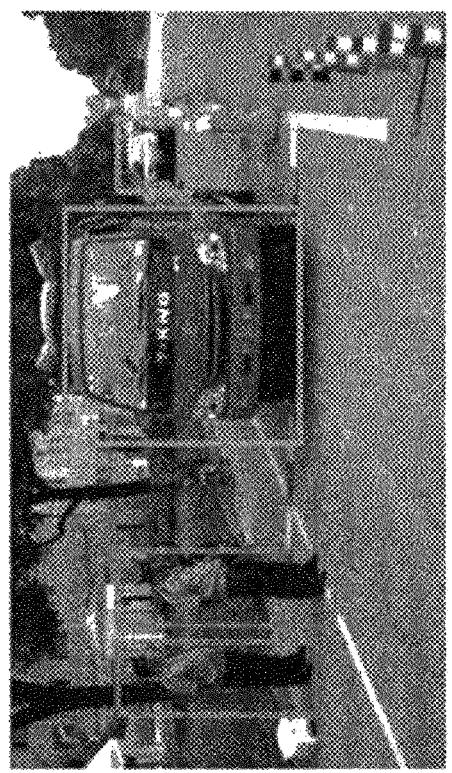
Figure 5:
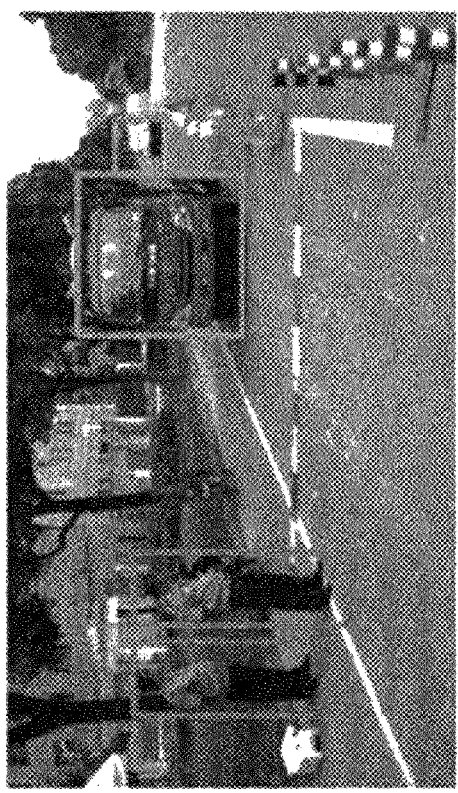
Figure 5:
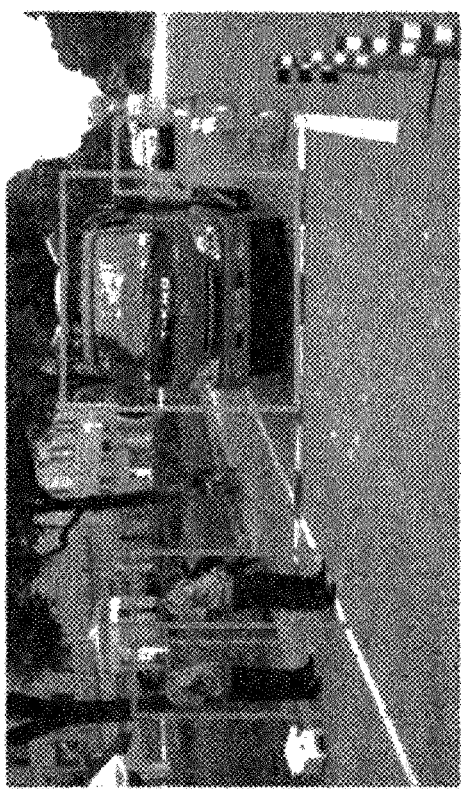

FIG. 5 presents an example output of simultaneous inference in ROI detection. In this example, the system detects two types of ROI from a group of video frames: people and vehicles. To do it, two different object detectors, one for people and one for vehicles, are applied on every frame to produce the locations of those ROIs. Here people ROIs are shown in red boxes, while vehicle ROIs are shown in green boxes.

Figure 6:
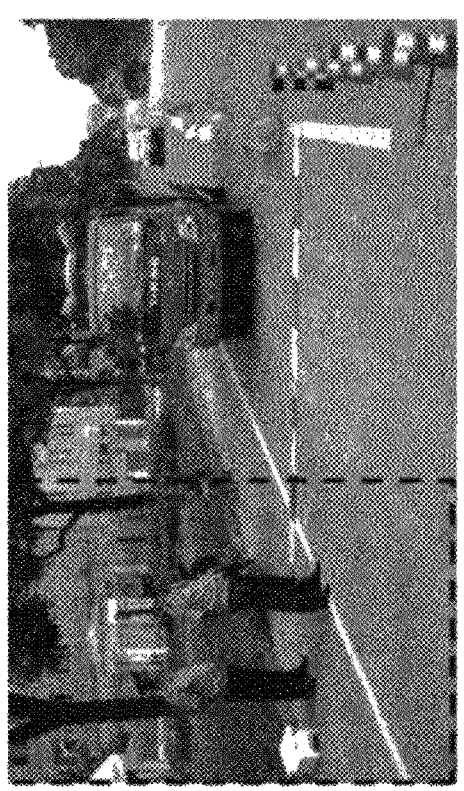
FIG. 6 presents an example of asynchronous inference in object ROIs detection according to various embodiments.
Figure 6:
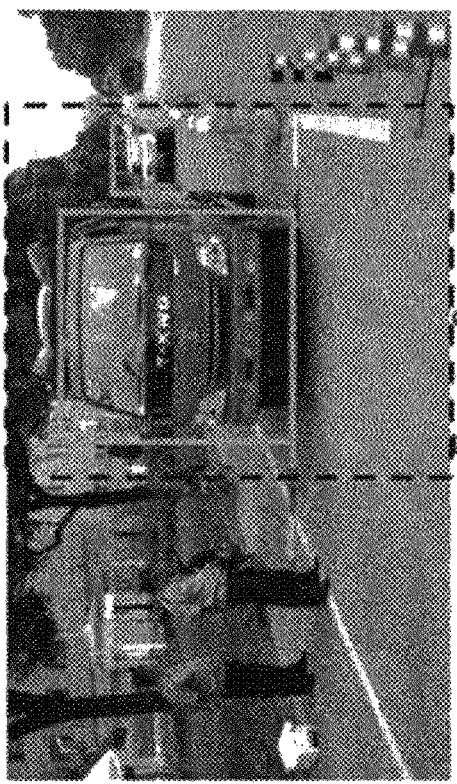
Figure 6:
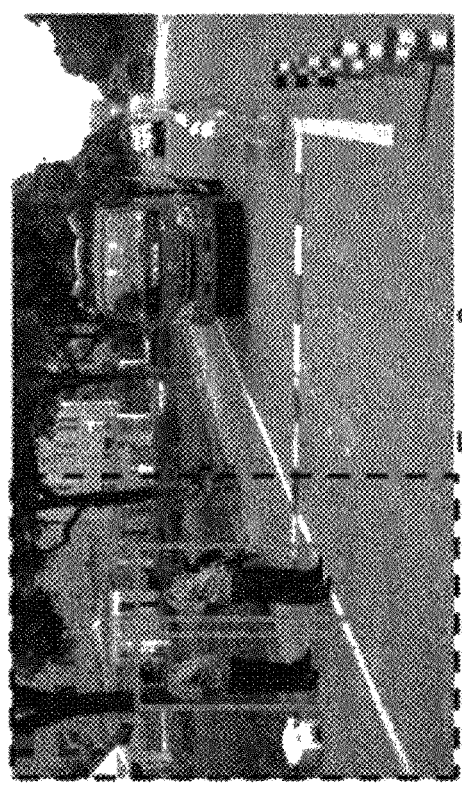
Figure 6:
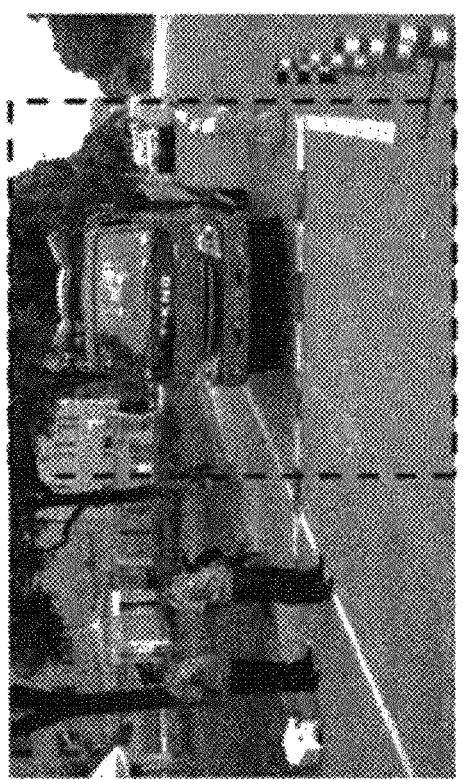

FIG. 6 presents an example of asynchronous inference in object ROI detection according to various embodiments. Before asynchronous inference is applied, a set of control rules is defined, for example as shown in Table 1. In this example, the Loop Number is set to 4, and the Rule Table is defined as shown in Table 1.

The process region in each frame is shown as a black dashed box in FIG. 6. In Frame 0, only the people detector is applied inside the process region, and two people ROIs are provided. In Frame 1, only the vehicle detector is applied, and no result is provided because there is no vehicle inside the current process region. The results are similar for Frame 2 and Frame 3. In Frame 2, only the people detector is applied and no result is provided because there are no people inside the current process region. On Frame 3, only the vehicle detector is applied inside the process region, and two vehicle ROIs are provided. The same procedure repeats in the following frames.

In this example, compared with simultaneous ROI detection, which detects objects in a whole image, asynchronous ROI detection detects objects in a partial image, the process region. With the asynchronous technique of the present invention, the overall cost is reduced to be ¼ of that of the simultaneous technique.

Figure 7:
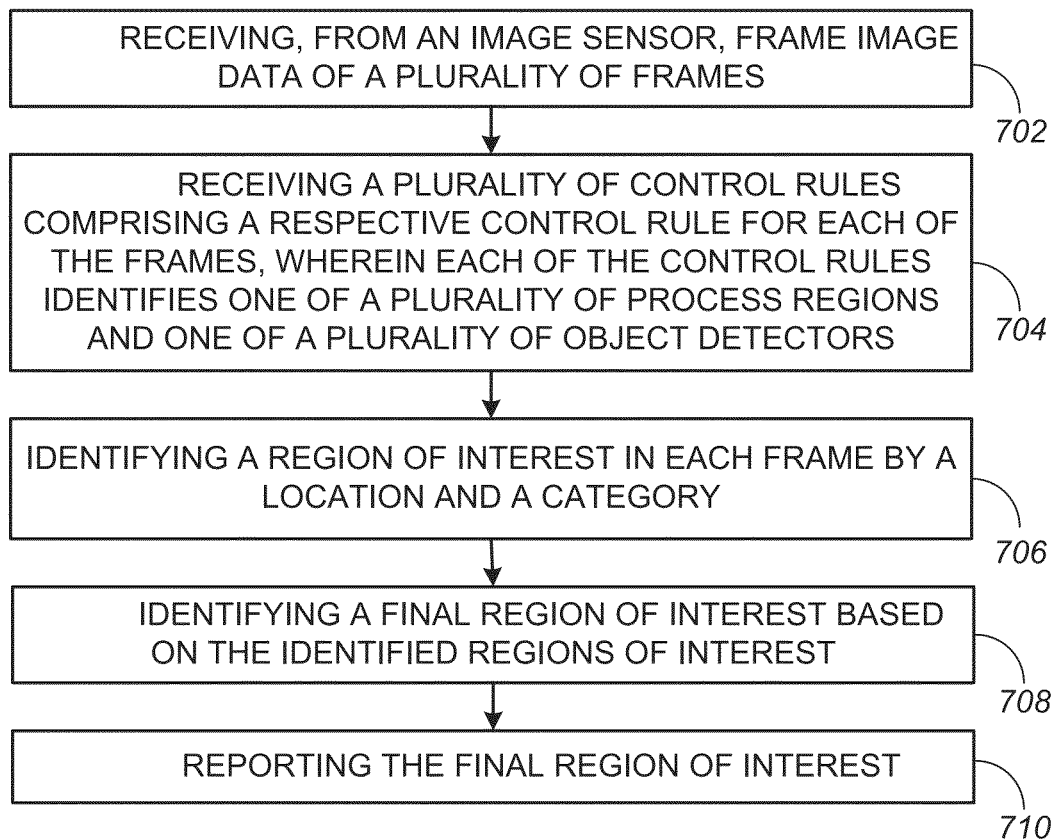
FIG. 7 illustrates a flowchart of an exemplary image data processing method according to various embodiments.

FIG. 7 illustrates a flowchart 700 of an exemplary image data processing method 700 according to various embodiments. The exemplary method may be implemented in various environments including, for example, the functional units of the AI-based image sensor illustrated in FIG. 1. The operations of the exemplary method presented below are intended to be illustrative. Depending on the implementation, the exemplary method may include additional, fewer, or alternative steps performed in various orders or in parallel. Also, this flowchart illustrates blocks (and potentially decision points) organized in a fashion that is conducive to understanding. It should be recognized, however, that the blocks can be reorganized for parallel execution, reordered, and modified (changed, removed, or augmented), where circumstances permit.

The flowchart 700 starts at block 702, with receiving, from an image sensor, frame image data of a plurality of frames. The frames may be consecutive images in a video, for example such as a video produced by an image sensor in video mode. In a specific implementation, the frame input unit 400 of FIG. 4 receives the frames from an image sensor array of an AI-based image sensor.

The flowchart 700 continues to block 704, with receiving a plurality of control rules. The control rules may include a respective control rule for each of the frames. Each of the control rules may identify one of a plurality of process regions and one of a plurality of object detectors. In some embodiments, at least two of the control rules identify different process regions. In some embodiments, at least two of the control rules identify different object detectors. In a specific implementation, the rule input unit 410 of FIG. 4 receives the control rules.

The flowchart 700 continues to block 706, with identifying a region of interest in each frame by a location and a category. Identifying the region of interest in each frame by location and category may include applying the object detector identified by the respective control rule to the respective frame image data in the process region identified by the respective control rule. Identifying a region of interest in each frame may include identifying a category confidence value, wherein the category confidence value represents a confidence in the identified category. In some embodiments, the sensor may use a hardware crop function to isolate each process region. In a specific implementation, the detect unit 430 of FIG. 4 identifies the region of interest in each frame by a location and a category.

The flowchart 700 continues to block 708, with identifying a final region of interest based on the identified regions of interest. Identifying a final region of interest may include identifying a final location of the final region of interest based on the locations of the regions of interest. Identifying a final region of interest may include identifying a category of the final region of interest based on the categories of the regions of interest. Identifying a category of the final region of interest may include selecting one of the categories according to the category confidence values. In a specific implementation, the vote unit 440 of FIG. 4 identifies the final region of interest based on the identified regions of interest.

The flowchart 700 continues to block 710, with reporting the final region of interest. In a specific implementation, the vote unit 440 of FIG. 4 reports the final region of interest.

Figure 8:
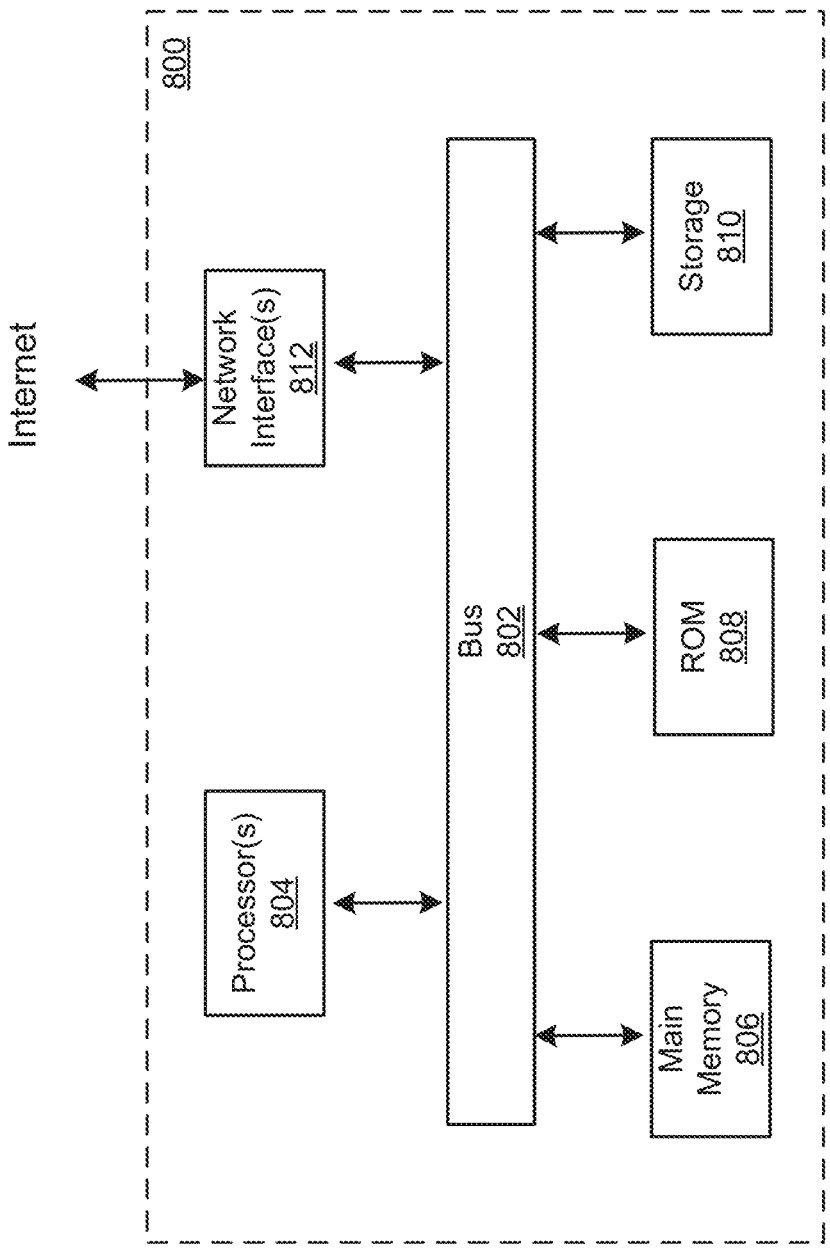
FIG. 8 illustrates a block diagram of an exemplary computer system to implement one or more functionalities of an AI-based image sensor according to various embodiments.

FIG. 8 illustrates a block diagram of an exemplary computer system 800 to implement one or more of functionalities of the AI-based image sensor according to various embodiments. In some embodiments, the system 800 may correspond to one or more of the first resolution modification unit 204, the feature detection unit 206, the second resolution modification unit 212, the pre-processing unit 214, and the data combination unit 216 illustrated in FIG. 2. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The main memory 806, the ROM 808, and/or the storage 810 may include non-transitory storage media. The term 'non-transitory media,' and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term 'invention' merely for convenience and without intending to voluntarily limit the scope of this application to any single disclosure or concept if more than one is, in fact, disclosed.

The Detailed Description is not to be taken in a limiting sense, and the scope of various embodiments is defined only by the appended claims, along with the full range of equivalents to which such claims are entitled.

The invention claimed is:

1. An image data processing method comprising:
   receiving frame image data of a plurality of frames;
   receiving a plurality of control rules comprising a respective control rule for each of the frames, wherein each of the control rules identifies one of a plurality of process regions and one of a plurality of object detectors;
   identifying a region of interest in each frame by a location and a category, comprising applying the object detector identified by the respective control rule to the respective frame image data in the process region identified by the respective control rule;
   identifying a final region of interest based on the identified regions of interest; and
   reporting the final region of interest.

2. The image data processing method of claim 1, wherein identifying a final region of interest comprises:
   identifying a final location of the final region of interest based on the locations of the regions of interest.

3. The image data processing method of claim 1, wherein identifying a region of interest in each frame comprises:
identifying a category confidence value, wherein the category confidence value represents a confidence in the identified category.

4. The image data processing method of claim 1, wherein identifying a final region of interest comprises:
identifying a category of the final region of interest based on the categories of the regions of interest.

5. The image data processing method of claim 4, wherein identifying a category of the final region of interest comprises: selecting one of the categories according to category confidence values.

6. The image data processing method of claim 5, wherein selecting one of the categories comprises:
selecting the one of the categories having the highest category confidence value.

7. An image sensor comprising:
a frame input unit configured to receive, from the image sensor, frame image data of a plurality of frames;
a rule input unit configured to receive a plurality of control rules comprising a respective control rule for each of the frames, wherein each of the control rules identifies one of a plurality of process regions and one of a plurality of object detectors;
a process unit configured to identify a region of interest in each frame by a location and a category, the process unit further configured to comprising applying the object detector identified by the respective control rule to the respective frame image data in the process region identified by the respective control rule;
a vote unit configured to identify a final region of interest based on the identified regions of interest; and
a report unit configured to report the final region of interest.

8. The image sensor of claim 7, wherein the vote unit is further configured to:
identify a final location of the final region of interest based on the locations of the regions of interest.

9. The image sensor of claim 7, wherein the process unit is further configured to:
identify a category confidence value, wherein the category confidence value represents a confidence in the identified category.

10. The image sensor of claim 7, wherein the vote unit is further configured to:
identify a category of the final region of interest based on the categories of the regions of interest.

11. The image sensor of claim 10,
wherein to identify the category of the final region of interest, the vote unit is further configured to: select one of the categories according to category confidence values.

12. The image sensor of claim 11, wherein to select one of the categories, the vote unit is further configured to:
select the one of the categories having the highest category confidence value.

13. A non-transitory machine-readable storage medium encoded with instructions executable by a hardware processor, the machine-readable storage medium comprising instructions to cause the hardware processor to perform an image data processing method, the method comprising:
receiving, from an image sensor, frame image data of a plurality of frames;
receiving a plurality of control rules comprising a respective control rule for each of the frames, wherein each of the control rules identifies one of a plurality of process regions and one of a plurality of object detectors;
identifying a region of interest in each frame by a location and a category, comprising applying the object detector identified by the respective control rule to the respective frame image data in the process region identified by the respective control rule;
identifying a final region of interest based on the identified regions of interest; and
reporting the final region of interest.

14. The medium of claim 13, wherein identifying a final region of interest comprises:
identifying a final location of the final region of interest based on the locations of the regions of interest.

15. The medium of claim 13, wherein identifying a region of interest in each frame comprises:
identifying a category confidence value, wherein the category confidence value represents a confidence in the identified category.

16. The medium of claim 13, wherein identifying a final region of interest comprises:
identifying a category of the final region of interest based on the categories of the regions of interest.

17. The medium of claim 16,
wherein identifying a category of the final region of interest comprises: selecting one of the categories according to category confidence values.

18. The medium of claim 17, wherein selecting one of the categories comprises:
selecting the one of the categories having the highest category confidence value.

* * * * *